(12) United States Patent
Bailly et al.

(10) Patent No.: US 9,731,487 B2
(45) Date of Patent: Aug. 15, 2017

(54) METHOD FOR ASSEMBLING A BOX STRUCTURE AND STRUCTURE OBTAINED BY SUCH A METHOD

(71) Applicant: DAHER AEROSPACE, Saint Julien de Chedon (FR)

(72) Inventors: Dominique Bailly, La Chevroliere (FR); Mathieu Hottin, Saint Aignan de Grandlieu (FR)

(73) Assignee: DAHER AEROSPACE, Saint Julien de Chedon (FR)

( * ) Notice: Subject to any disclaimer, the term of this patent is extended or adjusted under 35 U.S.C. 154(b) by 199 days.

(21) Appl. No.: 14/345,396

(22) PCT Filed: Sep. 17, 2012

(86) PCT No.: PCT/EP2012/068264
§ 371 (c)(1),
(2) Date: Mar. 17, 2014

(87) PCT Pub. No.: WO2013/038012
PCT Pub. Date: Mar. 21, 2013

(65) Prior Publication Data
US 2014/0346179 A1 Nov. 27, 2014

(30) Foreign Application Priority Data
Sep. 16, 2011 (FR) ...................................... 11 58277

(51) Int. Cl.
*B29C 65/48* (2006.01)
*B64C 1/12* (2006.01)
(Continued)

(52) U.S. Cl.
CPC ........ *B32B 37/1292* (2013.01); *B29C 65/483* (2013.01); *B29C 65/542* (2013.01);
(Continued)

(58) Field of Classification Search
CPC .... B32B 37/1292; B64D 37/06; B64D 37/04; B29C 65/483; B29C 66/112;
(Continued)

(56) References Cited

U.S. PATENT DOCUMENTS 5,273,606 A 12/1993 Greve et al.
6,742,258 B2 * 6/2004 Tarbutton ............. B21D 26/033
29/421.1
(Continued)

FOREIGN PATENT DOCUMENTS

| DE | 19844411 A1 | 4/2000 |
|---|---|---|
| DE | 10260430 A1 | 7/2004 |
| JP | 57-152917 A | 9/1982 |

*Primary Examiner* — Jun Yoo
(74) *Attorney, Agent, or Firm* — Im IP Law; C. Andrew Im

(57) ABSTRACT

A method for assembling a skin and a flange of a stiffener. The periphery of the contact between the skin and the flange of the stiffener is sealed by applying a bead of adhesive on the flange of the stiffener in contact with the skin. A first and second orifices are made in the skin. The orifices open at the interface between the skin and the flange of the stiffener. The adhesive is injected through the first orifice at the interface between the skin and the flange of the stiffener while keeping the skin in contact with the stiffener until the interface between the skin and the stiffener is completely filled with the adhesive.

3 Claims, 4 Drawing Sheets

(51) Int. Cl.
*B32B 37/12* (2006.01)
*B29C 65/54* (2006.01)
*B64C 3/20* (2006.01)
*B64C 3/26* (2006.01)
*B29C 65/00* (2006.01)
*B64D 37/04* (2006.01)
*B64D 37/06* (2006.01)
*B29L 31/00* (2006.01)
*B29L 31/30* (2006.01)

(52) U.S. Cl.
CPC .......... *B29C 66/112* (2013.01); *B29C 66/114* (2013.01); *B29C 66/131* (2013.01); *B29C 66/3452* (2013.01); *B29C 66/474* (2013.01); *B29C 66/524* (2013.01); *B29C 66/721* (2013.01); *B64C 3/20* (2013.01); *B64C 3/26* (2013.01); *B64D 37/04* (2013.01); *B64D 37/06* (2013.01); *B29C 65/485* (2013.01); *B29C 65/4835* (2013.01); *B29C 65/4885* (2013.01); *B29C 66/324* (2013.01); *B29C 66/7212* (2013.01); *B29C 66/7394* (2013.01); *B29L 2031/3085* (2013.01); *B29L 2031/737* (2013.01)

(58) Field of Classification Search
CPC ... B29C 66/721; B29C 66/114; B29C 66/131; B29C 66/474; B29C 66/3452; B29C 66/524; B29C 65/542; B29C 66/7394; B29C 66/7212; B29C 65/485; B29C 65/4835; B29C 65/4885; B29C 66/324; B64C 3/26; B64C 3/20; B29L 2031/737; B29L 2031/3085
USPC .............. 264/216; 156/60, 285–289, 245, 87
See application file for complete search history.

(56) References Cited

U.S. PATENT DOCUMENTS

| | | | |
|---|---|---|---|
| 7,080,805 B2* | 7/2006 | Prichard | B64C 1/12 244/117 R |
| 7,645,406 B2* | 1/2010 | Kilwin | B29C 65/544 156/245 |
| 7,712,993 B2* | 5/2010 | Frisch | E04C 2/243 244/132 |
| 2006/0049552 A1 | 3/2006 | Fish | |
| 2006/0243382 A1 | 11/2006 | Kilwin et al. | |
| 2007/0261787 A1 | 11/2007 | Malis | |
| 2010/0242256 A1* | 9/2010 | Gorr | B64F 5/0009 29/527.1 |
| 2012/0279560 A1* | 11/2012 | Sumida | H01L 31/042 136/251 |

* cited by examiner

METHOD FOR ASSEMBLING A BOX STRUCTURE AND STRUCTURE OBTAINED BY SUCH A METHOD

RELATED APPLICATIONS

This application is a §371 application from PCT/EP2012/068264 filed Sep. 17, 2012, which claims priority from French Patent Application No. 11 58277 filed Sep. 16, 2011, each of which is herein incorporated by reference in its entirety.

TECHNICAL FIELD OF THE INVENTION

The invention relates to a method for assembling a structure known as a box structure and a structure obtained using such a method. It is more particularly but not exclusively suitable for making box structures for aeronautics applications such as wings or tail units made of metal or composite materials with fiber reinforcement.

BACKGROUND OF THE INVENTION

A structure known as a box structure represented schematically in FIG. 1A is a structural assembly, that is to say an assembly adapted to transmit mechanical loads, comprising two skins (101, 102) separated by stiffeners extending in two concurrent directions, wherein said longer stiffeners are generally called spars (111, 112) and shorter stiffeners are generally called ribs (121, 122).

In FIG. 1B, a straight section of these stiffeners shows an overall shape comprising two flanges (116, 118) separated by a core (115), wherein the skins (101, 102) are joined to the flanges (116,118) on the application surfaces (130) of said flanges. Said stiffeners make the structure more rigid, while the skins drain the mechanical loads to all said stiffeners. Thus, the quality of assembly of the skins with the stiffeners is of crucial importance for the mechanical transfer to occur. The stiffeners and the skins demarcate closed spaces, which are accessible by hatches (140) made in the stiffeners.

According to the prior art, particularly in the area of aeronautics, the skins are assembled to the stiffeners with rivet type fasteners. This technical solution does however have drawbacks. The use of rivets entails drilling holes into the flanges of the stiffeners, which weakens them. These holes are potential sources for the initiation of fatigue cracks, which is why said rivets are generally fitted with high interference in order to apply pressure on the walls of the holes made for them. The flow of forces transmitted between the skins and stiffeners use the application of caulking stress on said walls of holes. Thus, the use of materials that are unable to undergo plastic deformation such as composite materials with fiber reinforcement is not favorable, from the point of view of both the caulking strength and the possibility of high-interference fitting. Even in the presence of metal materials, the implementation of this assembly solution is lengthy and requires, at least for the assembly of one of the skins, the use of blind fasteners that can be installed by accessing only one side of said skin, and fasteners of this type are further expensive and difficult to install. Glued assembly solutions have been envisaged in the prior art.

These glued solutions are called interposition solutions. They consist in applying adhesive to the assembly interface between the skin and the flange, either both or one of the surfaces depending on the embodiment, then putting the two surfaces in contact under pressure, where said pressure is sufficient to make the adhesive flow so that it fills the interface between the two parts with even and definite thickness. However, while such solutions can be envisaged for assembling stiffened panels, that is to say stiffeners assembled with a single skin, these techniques are difficult or even impossible to apply on box structures. That is because if, with a stiffened panel, stiffeners can be glued one after the other to said skin, the assembly of the second skin of a box structure implies that all the stiffeners must be glued at the same time. Such an operation requires a large quantity of adhesive that must be applied and made to flow at the contacts, which cannot be envisaged when the surfaces concerned are large in view of the short open time for applying the adhesive and the very high and even pressure that must be applied to obtain sufficient flow of said adhesive and the absence of gluing defects.

The document U.S. Pat. No. 5,273,606 describes the assembly by gluing of a skin and a stiffened panel to that skin. The document considers that such a stiffened panel may be assimilated with a stiffener and does not describe the assembly by gluing of the flange of said stiffener on the skin. That is because the assembly method described in this document is applied at the periphery of the stiffened panel, by means of a hem made by folding an extra length of the skin over the periphery of said skin. Said hem presses against the periphery of the stiffened panel, and gluing is applied between the two sides opposite the hem. Thus, the assembly principle is only applicable between two panels, as gluing limited to the periphery would not allow the transfer of loads to the stiffeners.

The document JP 57 152917 describes a method of gluing a stiffener to a skin. However, the document does not describe the gluing of the flange of said stiffener to the skin.

These two documents of the prior art are aimed at solving the technical problem relating to gluing and consisting in obtaining a continuous film of adhesive with even thickness over the entire assembly interface. The solutions to that technical problem that have been proposed by these documents of the prior art consist in making spaces with a substantially calibrated thickness into which the adhesive is injected. These two documents of the prior art disclose the creation of these spaces directly in the assembled elements, by creating a hem or a boss that creates a space in the wing of the stiffener. Both the boss and the hem add to the complexity and cost of making the parts and add mass to the panel without making it stronger, which is particularly unfavorable in the aeronautics context.

OBJECT AND SUMMARY OF THE INVENTION

In order to remedy the drawbacks of the prior art, the invention discloses a method for assembling a skin and the flange of a stiffener, wherein said method comprises the steps of:
  a. sealing the periphery of the contact between the skin and the flange of the stiffener by applying a bead of adhesive on the flange of the stiffener in contact with the skin;
  b. making a first and second orifice, known as vent orifices, in the skin, wherein said orifices open at the interface between the skin and the flange of the stiffener;
  c. injecting adhesive through the first orifice, called the injection orifice, at the interface between the skin and the flange of the stiffener while keeping said skin in contact with the stiffener until the interface between the skin and the stiffener is filled.

Thus, the quantity of adhesive to apply to the stiffener is limited to one bead. Said bead is easy to apply in the open time of the adhesive. Injection makes it possible to fill the entire interface with adhesive, while the vent orifice helps make sure that there is no air pocket between the two. Step (c) takes place with access only to the outer side of the skin. Thus, said method is particularly suited to placing the second skin of a box structure. In an alternative method according to the invention, step (b) may be carried out before step (a), particularly to avoid the introduction of chips at the interface between the flange of the stiffener and the skin. The bead of adhesive applied on the flange of the stiffener makes it possible to create a thickness space that is substantially calibrated between the skin and the flange of the stiffener, without modifying the shape of the flange or the panel.

The invention can be implemented according to the advantageous embodiments described below, which can be considered individually or in any technically operative combination.

Advantageously, the step (a) of the method according to the invention comprises the operations of:
  ai. applying a continuous bead of adhesive on the perimeter of the flange of the stiffener;
  aii. positioning and squeezing the skin on the flange of the stiffener;
  aiii. making a fillet of adhesive along the location of the stiffener on the side of the skin assembled with said stiffener;
  aiv. curing the bead and the fillet while maintaining the contact of the skin on the stiffener.

Thus, the placing force applied on the skin is limited to making the bead flow. The skin is held on the stiffeners by that same bead after curing. The fillet seals the assembly.

In an alternative method according to the invention adapted for gluing a stiffener over a great length, the step (b) comprises the operations of:
  bi. making a plurality of first orifices;
  bii. occluding said first orifices with the exception of one, using temporary occluding means;
  biii. making the second orifice.

These operations can be carried out in any order. By making several first orifices, called injection orifices, the injection is better distributed over the entire length of the interface and the injection pressure may be reduced.

According to this alternative of the method, the step (c) comprises the operations of:
  ci. injecting adhesive in the first unoccluded orifice until the edge of the adhesive appears under the means that temporarily occlude one of the first orifices made in step (bi);
  cii. occluding the previous injection orifice;
  ciii. uncovering the orifice reached by the edge of adhesive and using it as the injection orifice until the edge of the adhesive appears under the means that temporarily occlude one of the first orifices made in step (bi);
  civ. repeating from step (cii) until the interface between the skin and the stiffener is filled.

Thus the advance of the edge of adhesive is easily tracked, which ensures the quality of gluing.

The invention also relates to a method for making a structure comprising:
  a plurality of stiffeners extending longitudinally along concurrent directions, comprising a section with a core and surfaces known as application surfaces that extend on each side of said core
  two skins in contact with all the stiffeners, each skin on the application surfaces opposite said stiffeners so as to create empty volumes between the two skins;

Said method is remarkable in that:
  the joining of at least two stiffeners with one of the skins is carried out by a method according to a previous alternative, and in that it comprises the steps of:
    d. waiting for the adhesive of that joint to be cured after the completion of the step (c) of joining a stiffener to said skin;
    e. carrying out the step (c) of joining the other stiffener to said skin after the step (d).

This method is particularly suitable for making large structures and offers flexibility, firstly in the management of the open time of the adhesive, secondly in the management of the mechanical constraints relating to gluing imposed at the interfaces and at the structure.

This method can be used advantageously for making a box structure where one of the empty volumes is used as a tank. Such a structure would indeed allow particularly effective and lasting sealing because no assembly hole goes through the walls of the closed volumes. Besides, this assembly mode offers the possibility of applying protective primers on the elementary parts before assembly, which primers are not damaged during the subsequent assembly operations.

BRIEF DESCRIPTION OF THE DRAWINGS

The invention is described below in its preferred embodiments, which are not limitative in any way, and with reference to FIGS. 1 to 7, wherein:

FIG. 1A is a front perspective view of a box structure according to an exemplary embodiment of the invention, wherein FIG. 1A is a sectional view of a spar of said structure shown in FIG. 1A;

DETAILED DESCRIPTION OF THE EMBODIMENTS

Before the method according to the invention is implemented, the surfaces concerned by gluing undergo preparation according to the art such as degreasing and stripping to ensure that the adhesive bonds adequately with said surfaces.

Figure 2:
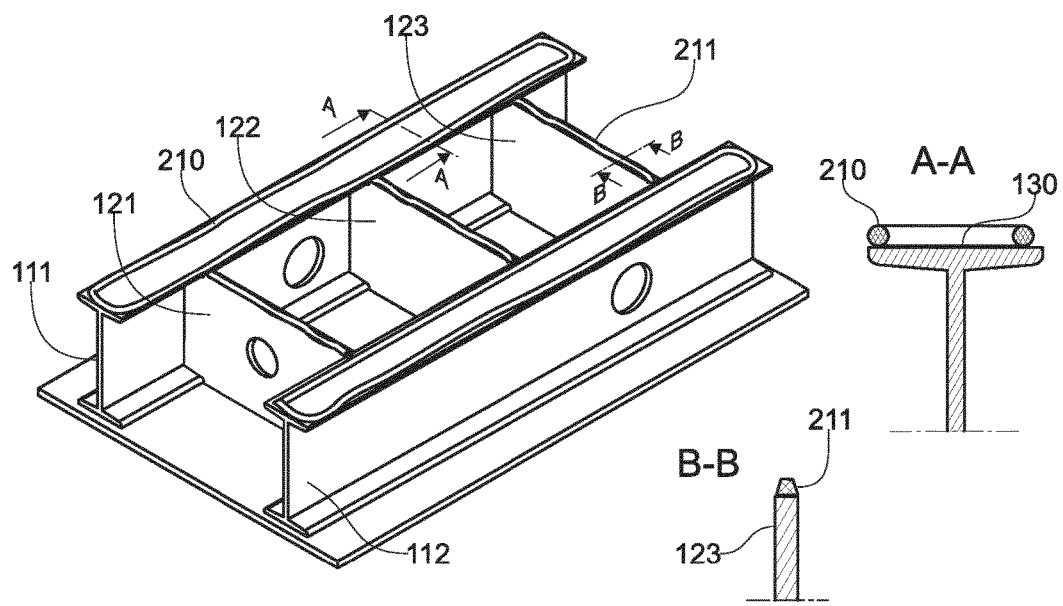
FIG. 2 is a perspective view from the same point of view as in FIG. 1A of a box structure during a step of applying the method according to the invention, and shows in the sections AA and BB defined in that same figure the shape of the beads of adhesive applied on the flanges of the spars and the secondary ribs, according to an exemplary embodiment of the method according to the invention.

In FIG. 2, in a first step of the method according to the invention, a structural bead of adhesive (210) adapted to the assembly required is applied on the periphery of the flange of the stiffeners in contact with the skin. Said adhesive is applied with a pneumatic gun using a nozzle adapted to create the diameter of the bead. As a non-limitative example, the adhesives used may be made of polyurethane or epoxy resin, with one or two components according to the nature of the assembly, but in any case, said adhesive must have viscosity sufficient for the application to be able to create such a bead, that is to say BROOKFIELD viscosity (according to the French standard NFT 76 102) greater than or equal to $100,000 \cdot 10^{-3} \cdot Pa \cdot s$ (100,000 centipoises). Said beads have a diameter ranging between 1 mm and 5 mm depending on the width of the flanges (118) of the stiffeners and the shape tolerances for both the stiffeners (111, 112, 121, 122) and skins (101, 102). According to a first alternative, said bead of adhesive extends over the entire perimeter of the flange (118) of the stiffener. According to another alternative (not shown), one of the ends is not closed by the bead of adhesive.

That principle of gluing with a peripheral bead (210) is applied to stiffeners where the flange (118) is sufficiently wide, essentially spars (111, 112). In the case of ribs (121, 122, 123), if they are ribs known as strong ribs where the flange is wide, the same principle is applied, but if they are secondary ribs (121, 122, 123) with a small width, adhesive may be applied in only one bead (211) with a section that is substantially trapezoidal.

According to non-limitative examples, the epoxy adhesives distributed commercially under the trademark 3M® product SW 9323-2 or under the trademark HUNTSMAN® AW 4859 are adapted for the implementation of the method according to the invention.

Figure 3:
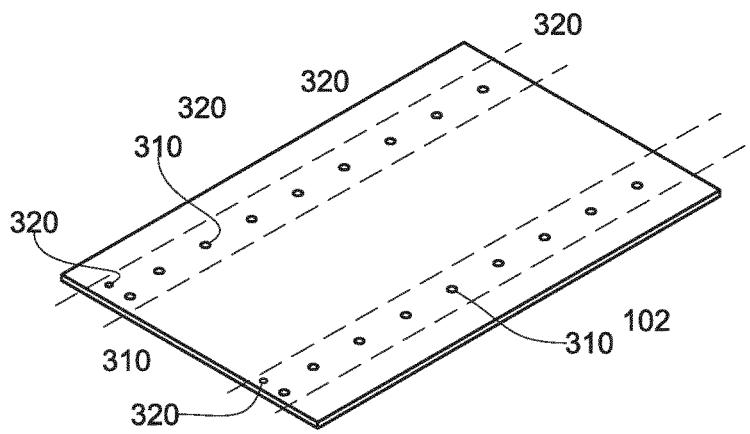
FIG. 3 is a front perspective view of one of the skins of the box structure in FIG. 1 during the drilling of injection and vent orifices according to an embodiment of the method of the invention.

In FIG. 3, in parallel with or prior to the previous operations, a plurality of orifices (310), called injection orifices and orifices (320) called vent orifices, all through orifices, are drilled in the skin (102) to be assembled, at the future locations of the stiffeners on said skin (102), for which the injection method is implemented. The number, spacing and position of the orifices are determined on the basis of the properties of the adhesive, particularly its viscosity and the properties of the interfaces, either by simulation or by experiment, so as to allow the uniform advance of the adhesive edge throughout the volume of the interface. The diameter of the injection orifices (310) is just necessary for passing the nozzle of the adhesive gun, which nozzle is selected so as to allow the filling of the interface between the flange of the stiffener and the skin, particularly depending on the width of the interface. Typically, the diameter of the injection orifices is located between 5 mm and 10 mm depending on the width of the interface.

Figure 4:
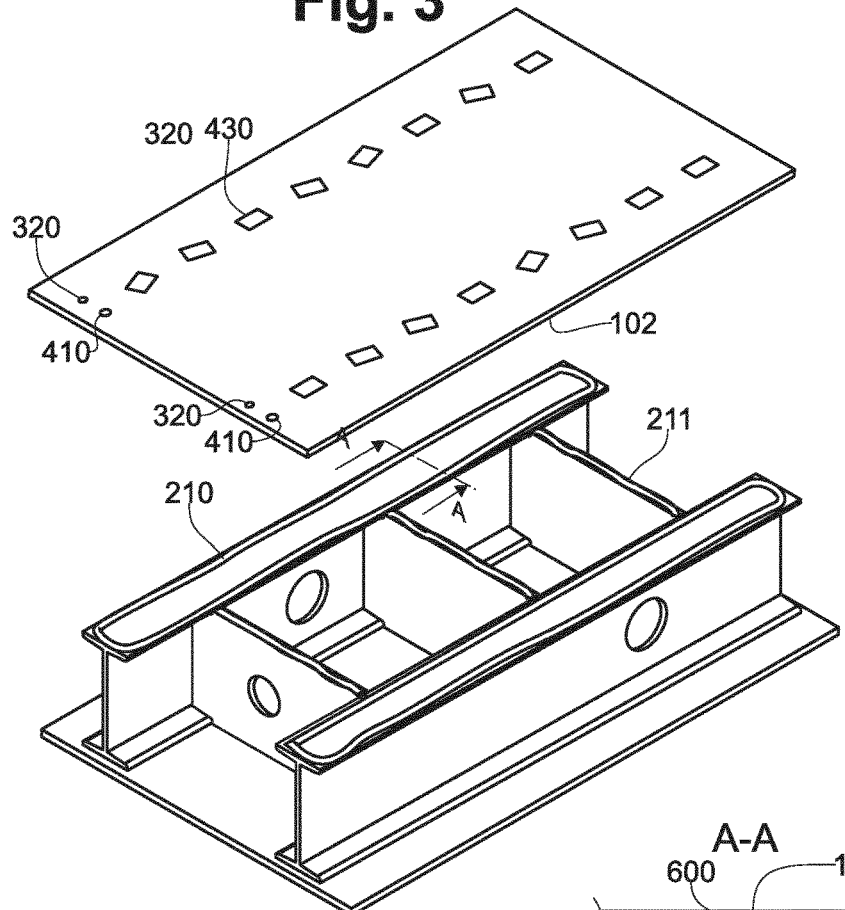
FIG. 4 is a perspective exploded view of the squeezing of the skin on the stiffeners of the box structure after occluding some of the orifices made in said skin during a previous step of the method according to the invention.

In FIG. 4, the injection orifices made in the previous step are occluded individually using temporary occluding means such as plastic plugs or adhesive tape (430) with the exception of the initial injection orifices (410) and the vent orifices (320). The skin is then squeezed with the box structure on the stiffeners on which the beads (210, 211) of adhesive have been applied, using appropriate tools, by applying on said skin (102) pressure that is just sufficient for crushing the beads (210, 211) of adhesive applied on the flanges (118) of the stiffeners.

Figure 5:
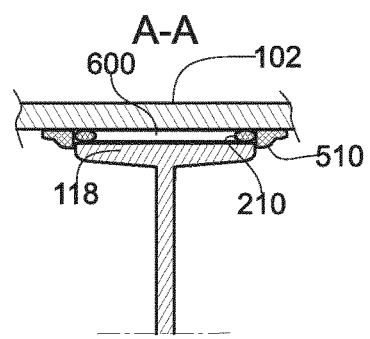
FIG. 5 is a partial view along a section A-A defined in FIG. 4 of the flange of the stiffener and the skin after the squeezing step and the making of fillets of adhesive according to the method of the invention.

In FIG. 5, fillets (510) of adhesive are made on the side of the skin (102) in contact with said stiffeners. These fillets are made by smoothing the excess adhesive that appears when the peripheral beads (210) are crushed and completed by the possible addition of adhesive with the gun. When the second skin (102) is installed on the box structure, that operation is carried out through the inspection hatches (140) or the bores made in the cores of the stiffeners in order to make them lighter or through an open end of the box structure.

Thus, the volumes (600) demarcated by the beads (210) of adhesive between the skin (102) and the flanges (118) of the stiffeners are closed in a sealed manner. The adhesive (210, 510, 211) is then cured so as to fix the skin (102) to the flanges of the stiffeners. The curing conditions depend essentially on the nature of the adhesive. As a non-limitative example, the curing time of an adhesive of the commercial type mentioned above for joining stiffeners and a skin made up of heat-setting resin reinforced by carbon fibers is 15 days at ambient temperature or 24 hours at ambient temperature followed by one hour at 80° C. or two hours at 65° C.

Figure 6:
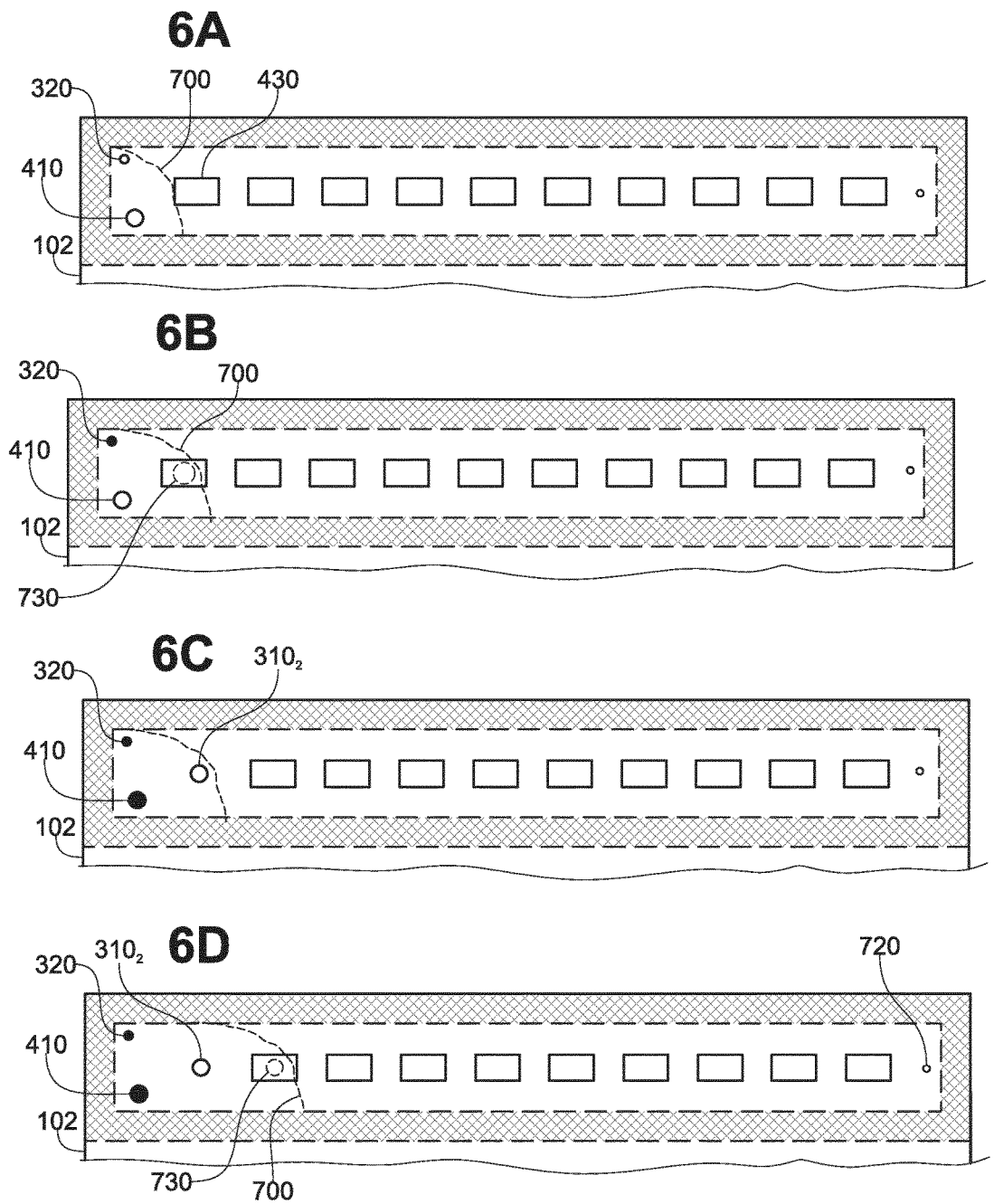
FIG. 6 is a schematic illustration of a top view of the different steps (FIGS. 6A to 6D) of the injection of adhesive at the interface between the stiffener and the skin according to an exemplary embodiment of the method according to the invention.

In FIG. 6A, after the beads of adhesive are fully cured, injection at the interface between a stiffener and the skin (102) starts by inserting the nozzle of an adhesive gun in the initial injection orifice (410), with the vent orifice (320) open. The adhesive is injected through the initial injection orifice (410) so as to make the edge of adhesive (700) advance until the adhesive is ejected through the vent orifice (320).

In FIG. 6B, the vent orifice (320) is then occluded with a plastic plug and injection through the initial injection orifice (410) is continued until the edge of adhesive (700) reaches the next injection orifice, which leads to the appearance of adhesive under the temporary occluding means of that orifice, for example in the form of a swelling (730) under the adhesive tape (430) occluding said orifice.

In FIG. 6C, the initial injection orifice (410) is then occluded by a plastic plug and injection is resumed by introducing the nozzle of the adhesive gun in the next injection orifice ($310_2$), after removing the adhesive tape (430) that was occluding it.

In FIG. 6D, injection through the second injection orifice ($310_2$) continues until the edge of adhesive (700) reaches the third orifice, which leads to the appearance of adhesive or a swelling (730) under the adhesive tape (430) occluding said orifice. The second injection orifice ($310_2$) is then occluded and injection is resumed by the next injection orifice and so on, until the volume of the gap (600) between the flange of the stiffener and the skin is completely filled. The occluding of orifices downstream from the edge of adhesive by simple adhesive tape ensures that the pressure in the gap (600) between the flange of the stiffener and the skin remains located between acceptable values that do not risk peeling the skin off the stiffeners. The choice of the temporary occluding means thus depends on the pressure to reach during the injection at the interface between the skin and the stiffener. The use of plastic plugs comprising means to limit their force for holding in the bore makes it possible to reach, if necessary, injection pressures that are higher than those allowed by occluding by means of adhesive tape.

The air contained in the gap is removed as the edge of adhesive advances, leading to high gluing quality. The assurance of the arrival of the edge of adhesive (700) at the end of the stiffener is obtained visually either by the overflow of adhesive at the end of the stiffener when the interface between the skin and the flange of the stiffener is open at that end, or by ejecting the adhesive through a vent orifice (720) at the end when the interface is fully closed by the bead of adhesive, which vent orifice (720) is then not occluded by the temporary occluding means at any time.

All these operations are then repeated with another stiffener and so on until all the gluing is complete. The gluing of two different stiffeners can be distanced in time, offering flexibility in the management of gluing constraints, particularly when the open time is short, or when the curing time of the adhesive is particularly exothermal and, for example, the stiffeners and skins are made of materials with different thermal dilation coefficients.

Figure 7:
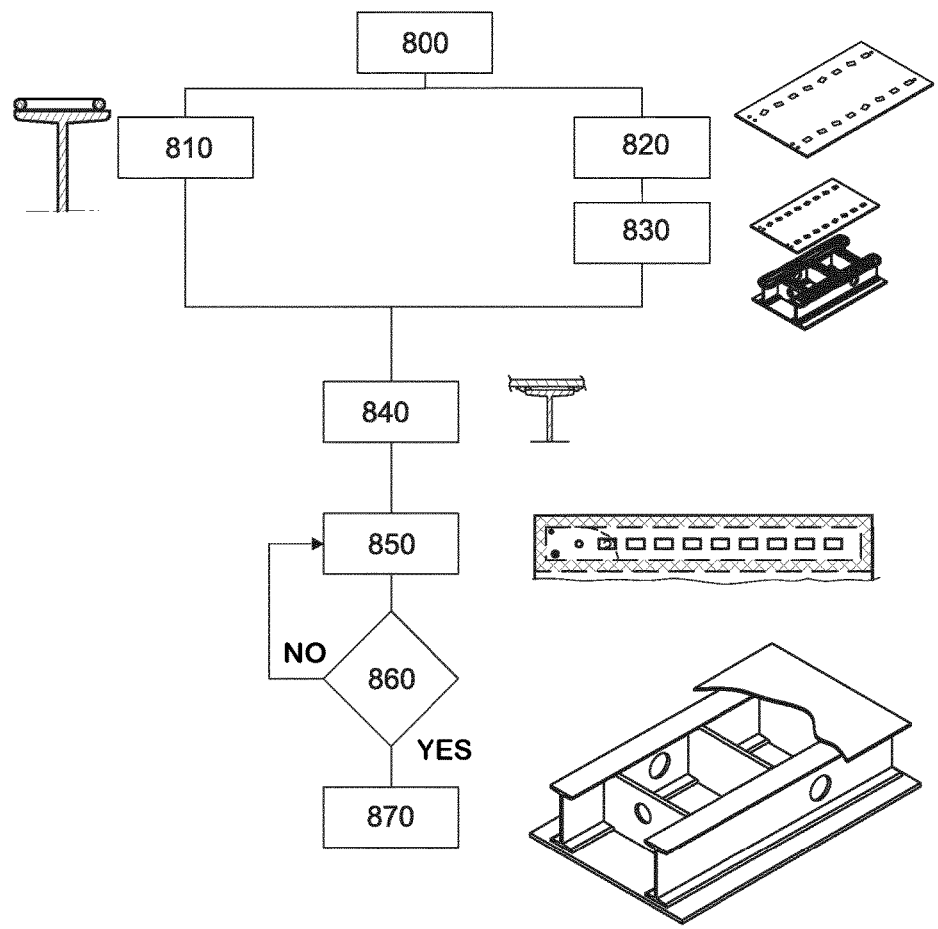
FIG. 7 is a chart of the method according to the invention.

In FIG. 7, in a chart of the method according to the invention, the essential steps of the method according to the invention take place from the elementary parts whose surfaces have been prepared for gluing during a preparation step (800) by:
- a step (820) of preparing the skin (102) consisting in drilling the injection and vent orifices in said skin;
- a set of steps (810, 830, 840) aimed at sealing the gaps between the stiffeners and the skin, which comprise:
- a step (810) of making beads of adhesive on the flanges of stiffeners;
- a step (820) of drilling the skin and installing temporary occluding means;
- a step (830) of squeezing the skin on the stiffeners followed by the making of adhesive fillets;
- a step (840) of curing the adhesive at the interfaces between the skin and the stiffeners;
- an injection step (850) aimed at filling the interface between one of the stiffeners and the skin with adhesive;
- a possible waiting step (860), as the injection step (850) is repeated as long as all the stiffeners are not fully glued.

These essential steps are followed by a step (870) of completion during which surfacing is carried out so as to adjust the flushness of the cured bead of adhesive protruding out of the injection and vent orifices.

Figure 1A:
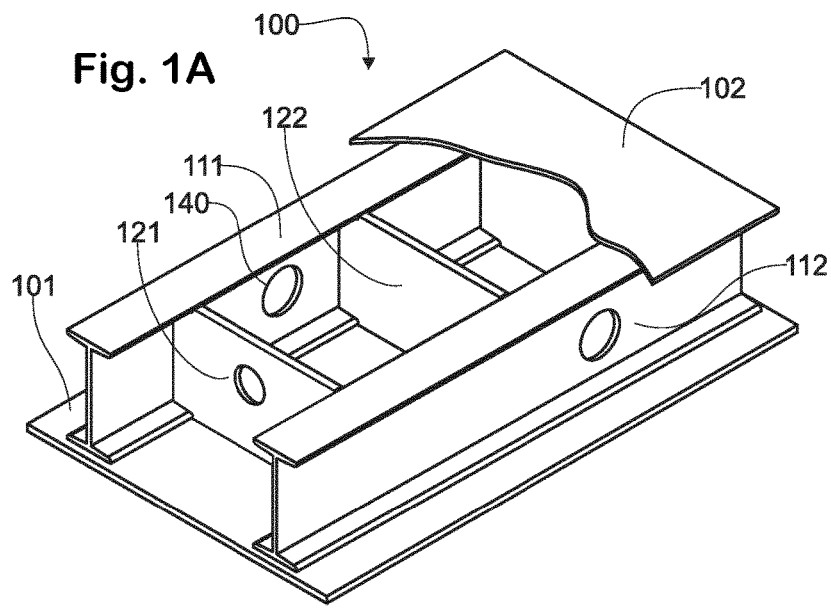
Figure 1B:
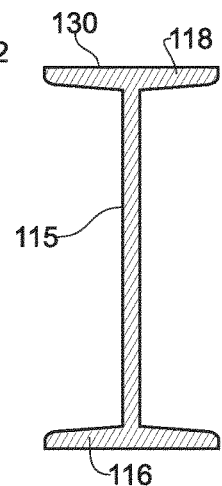

Returning to FIG. 1, the structure (100) made in this way is a structure known as a box structure, comprising empty volumes, e.g. the volume located between the two skins (101, 102), the two spars (111, 112) and the first two ribs (121, 122). The two skins (101, 102) are assembled to the stiffeners (111, 112, 121, 122) using the method according to the invention, and at no time does an assembly bore penetrate into that volume. The gluing method according to the invention perfectly fills the gaps between the flanges of the stiffeners, and so the empty volume, which does not need to be occupied by a core for the method for assembling the structure (100), is sealed after any possible access hatches are closed and can advantageously be used as a tank.

The description above and the exemplary embodiments show that the invention achieves the objectives sought, in particular it makes it possible to obtain a sealed box structure without using fasteners. It is more particularly suitable for making such structures where the skins and stiffeners are made of composite materials with fiber reinforcement. For the sake of convenience, the method according to the invention is represented applied to a simple box structure shape. However, the method can be adapted to structures of complex shapes, particularly non-developable shapes where said assembly method offers the advantage of being less sensitive to the manufacturing and positioning tolerances of such structures than the assembly methods of the prior art that use fasteners of the rivet type. Thus, the method according to the invention is particularly suited for making aircraft wings.

The invention claimed is:

1. A method for assembling a skin and the flange of a stiffener, comprising the steps of:
    sealing a periphery of a contact between the skin and the flange of the stiffener by applying a bead of adhesive on the flange of the stiffener in contact with the skin;
    providing a plurality of first orifices and a second orifice in the skin, wherein the orifices open at an interface between the skin and the flange of the stiffener;
    occluding each first orifice using a temporary occluding device, except for one first orifice;
    injecting adhesive in an unoccluded first orifice until an edge of the adhesive appears under the temporary occluding device of one of the occluded first orifices, at the interface between the skin and the flange of the stiffener while keeping the skin in contact with the stiffener;
    occluding the unoccluded first orifice;
    uncovering an occluded first orifice reached by the edge of adhesive and using it as the injection orifice until the edge of the adhesive appears under the temporary occluding device of one of the occluded first orifices; and
    repeating the steps of occluding and uncovering until the interface between the skin and the stiffener is filled with adhesive.

2. The method according to claim 1, wherein the bead of adhesive is continuously applied on a perimeter of the flange of the stiffener; and wherein the step of sealing further comprises the steps of:
    positioning and pressing the skin on the flange of the stiffener;
    providing a fillet of adhesive along a location of the stiffener on a side of the skin assembled with the stiffener; and
    curing the continuous bead and the fillet of adhesive while maintaining contact of the skin on the stiffener.

3. A method for making a box structure, comprising the steps of:
    joining at least two stiffeners with one of two skins by the method according to claim 1, wherein a plurality of stiffeners extend along concurrent directions and comprise a section with a core and application surfaces extending on each side of the core, and wherein two skins are in contact with the plurality of stiffeners, each skin on the application surfaces opposite the stiffeners so as to create empty cavities between the two skins;
    curing the adhesive joining a stiffener to the skin after completing the step of injecting the adhesive; and
    performing the step of injecting the adhesive to join another stiffener to the skin after the step of curing.

* * * * *